US011674492B2

(12) United States Patent
O'Brien et al.

(10) Patent No.: US 11,674,492 B2
(45) Date of Patent: Jun. 13, 2023

(54) CONTROL OF ENGINE-INTEGRATED ELECTRIC MACHINE

(71) Applicant: Cummins Inc., Columbus, IN (US)

(72) Inventors: John P. O'Brien, Columbus, IN (US); Jeffrey S. Rauch, Columbus, IN (US); Luke A. Bamford, Bishop Middleham (GB)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 16/322,331

(22) PCT Filed: Jul. 31, 2017

(86) PCT No.: PCT/US2017/044636
§ 371 (c)(1),
(2) Date: Jan. 31, 2019

(87) PCT Pub. No.: WO2018/026698
PCT Pub. Date: Feb. 8, 2018

(65) Prior Publication Data
US 2019/0195186 A1    Jun. 27, 2019

Related U.S. Application Data

(60) Provisional application No. 62/369,480, filed on Aug. 1, 2016.

(51) Int. Cl.
*F02N 19/00* (2010.01)
*B60K 1/02* (2006.01)
(Continued)

(52) U.S. Cl.
CPC .............. *F02N 19/005* (2013.01); *B60K 1/02* (2013.01); *B60K 6/24* (2013.01); *B60K 6/26* (2013.01);
(Continued)

(58) Field of Classification Search
CPC ........ F02N 11/00; F02N 19/00; F02N 19/005; F02N 2019/007; F02N 2019/008; F02N 2200/021; F02N 2200/047
(Continued)

(56) References Cited

U.S. PATENT DOCUMENTS 6,425,362 B1    7/2002  Kanno
6,453,864 B1    9/2002  Downs
(Continued)

FOREIGN PATENT DOCUMENTS

EP        1439295 A2      7/2004
EP        1489295 A2 *   12/2004  ............ B60W 10/06
(Continued)

OTHER PUBLICATIONS

International Search Report and Written Opinion issued by the ISA/US, Commissioner for Patents, dated Oct. 12, 2017, for International Application No. PCT/US2017/044636; 9 pages.
(Continued)

*Primary Examiner* — John Kwon
(74) *Attorney, Agent, or Firm* — Faegre Drinker Biddle & Reath LLP (57) ABSTRACT

System comprising an internal combustion engine including a crankshaft, a crankshaft sprocket coupled to the crankshaft, an electric motor in mechanical communication with the crankshaft sprocket, a bidirectional engine position sensor coupled to the crankshaft sprocket, a controller in electrical communication with the bidirectional engine position sensor and a non-transitory memory having instructions that, in response to execution by a processor, cause the processor to determine a position of an engine component upon shutdown of the engine, store the position of the engine component at shutdown in the non-transitory memory, and control the electric motor at restart in response to the
(Continued)

position of the engine component at shutdown are disclosed. Methods are also disclosed.

18 Claims, 8 Drawing Sheets (51) Int. Cl.
*B60K 6/26* (2007.10)
*B60K 6/485* (2007.10)
*B60K 6/24* (2007.10)
*B60W 10/08* (2006.01)
*F02N 11/08* (2006.01)
*F02N 11/04* (2006.01)
*G01M 15/06* (2006.01)

(52) U.S. Cl.
CPC ............ *B60K 6/485* (2013.01); *B60W 10/08* (2013.01); *F02N 11/0803* (2013.01); *B60K 2006/268* (2013.01); *B60W 2510/0685* (2013.01); *F02N 11/04* (2013.01); *F02N 11/08* (2013.01); *F02N 2200/042* (2013.01); *F02N 2200/046* (2013.01); *G01M 15/06* (2013.01)

(58) Field of Classification Search
USPC ................................. 701/112, 113; 73/114.26
See application file for complete search history.

(56) References Cited

U.S. PATENT DOCUMENTS

| 6,750,626 | B2 * | 6/2004 | Leonardi ................. B60L 50/16 318/602 |
| 7,026,772 | B2 | 4/2006 | Quirion |
| 7,261,076 | B2 | 8/2007 | Hoevermann |
| 7,527,580 | B2 | 5/2009 | Freisinger |
| 7,669,569 | B2 | 3/2010 | Tamai et al. |
| 7,999,496 | B2 | 8/2011 | Gleason et al. |
| 8,310,189 | B2 | 11/2012 | Patel et al. |
| 8,378,605 | B2 | 2/2013 | Wang et al. |
| 8,655,526 | B2 | 2/2014 | Schwenke et al. |
| 2002/0093202 | A1 | 7/2002 | Downs et al. |
| 2003/0045977 | A1 * | 3/2003 | Sato ........................... G06F 1/28 701/32.3 |
| 2004/0149247 | A1 * | 8/2004 | Kataoka ................ F02N 11/006 123/179.4 |
| 2006/0037578 | A1 | 2/2006 | Nakamura |
| 2008/0127935 | A1 * | 6/2008 | Park ........................ B60K 6/48 123/332 |
| 2009/0224557 | A1 * | 9/2009 | Reynolds .............. F02N 15/023 290/38 R |
| 2009/0287400 | A1 * | 11/2009 | Pursifull ............... F02D 41/009 701/113 |
| 2011/0035122 | A1 | 2/2011 | Katrak |
| 2011/0053733 | A1 * | 3/2011 | Swales .................. B60W 10/08 477/3 |
| 2011/0132307 | A1 * | 6/2011 | Patterson ............ F02N 11/0814 123/179.3 |
| 2012/0291739 | A1 * | 11/2012 | Hashimoto ............. F02N 11/08 123/179.3 |
| 2014/0046574 | A1 | 2/2014 | Eisenbarth et al. |
| 2014/0277881 | A1 | 9/2014 | Okubo et al. |

FOREIGN PATENT DOCUMENTS

| EP | 1586765 A1 | 10/2005 |
| JP | 2002195070 A * | 12/2000 |
| JP | 2002195070 A * | 7/2002 |
| WO | WO2015152866 A1 | 10/2015 |

OTHER PUBLICATIONS

European Search Report and Search Opinion Received for EP Application No. 17837462.5, dated Nov. 20, 2019, 6 pages.
International Preliminary Report on Patentability received for PCT Patent Application No. PCT/US2017/044636, dated Aug. 1, 2018, 18 pages.

* cited by examiner

CONTROL OF ENGINE-INTEGRATED ELECTRIC MACHINE

CROSS-REFERENCE TO RELATED APPLICATIONS

This application is a U.S national stage filing of PCT/US2017/044636, filed on Jul. 31, 2017, which claims priority to U.S. Provisional Application Ser. No. 62/369,480, filed on Aug. 1, 2016, the entire disclosure of which being hereby expressly incorporated herin by reference.

BACKGROUND

This disclosure relates to hybrid electric motor systems and methods and more particularly to sensor and sensorless systems and methods for determining and/or altering electric motor position and/or engine position.

The need to reduce fossil fuel consumption and reduce emissions in various systems, such as generators, automobiles, and other vehicles powered by internal combustion engines is continuing to grow in light of new governmental regulations, customer demand, and in an effort to reduce the operating costs of such systems. In an attempt to address these needs, some efforts have included the use of both an electric motor and an internal combustion engine, such as, for example, a hybrid electric vehicle.

When engine power is not needed (or the power is being provided by another source), it can be shut off. When needed, it is often desired that the engine restart and produce power quickly. In some engines, this restart can be delayed due to uncertainty around the engine component position, and a certain number of crankshaft revolutions that is required to determine the engine component position and begin fueling.

A bidirectional engine position sensor has been previously employed to minimize this delay by providing data to an algorithm which estimates initial engine component position for use in accurately timing the introduction of fuel. This results in fast restart events, but traditionally high engine crank fueling rates are required. In order to meet fast restart requirements but minimize fuel consumption, a higher power electric machine may be employed to rapidly accelerate the engine up to its desired speed without fueling.

There are both sensorless and sensor-based methods to control the electric machine. Sensorless control methods use known machine parameters, voltage and current measurements in the motor inverter to determine machine position. This control has worked well when the machine is rotating, however, such systems currently lack the ability to determine the electric motor position during initial startup or when the system is running at low speeds.

Systems with sensor-based control are generally able to more accurately determine the electric motor position, resulting in high efficiency and full torque capability at zero- or low-speed operation. However, these may require dedicated encoders and resolvers. The use of dedicated encoders and resolvers may increase the cost, complexity, and maintenance procedures of such systems.

Such systems can also suffer from increased inaccuracy during shutdown because various methods may fail to account for both positive and negative rotation during shutdown. Not accounting for negative rotation during shutdown, may decrease the efficiency and accuracy of such systems.

A need therefore exists to improve the accuracy, efficiency, size, cost, and complexity of such systems both during startup, during low power operations, and during shutdown.

SUMMARY

In some embodiments, systems may comprising an internal combustion engine including a crankshaft, a crankshaft sprocket coupled to the crankshaft, an electric motor in mechanical communication with the crankshaft sprocket, a bidirectional engine position sensor coupled to the crankshaft sprocket, a controller in electrical communication with the bidirectional engine position sensor and a non-transitory memory having instructions that, in response to execution by a processor, cause the processor to estimate a position of an engine component upon shutdown of the engine, store the position of the engine component at shutdown in the non-transitory memory, and control the electric motor at restart in response to the position of the engine component at shutdown.

Methods may comprise receiving, by a processor in electrical communication with a first sensor, a value indicating a position of an engine component in mechanical communication with an electric motor, estimating, by the processor, the position of the engine component at shutdown of the engine, and storing, by the processor, the position of the engine component at shutdown.

Additional methods may also comprise receiving, by a processor in electrical communication with a first sensor and a second sensor, a first position data of an engine and a second position data of an engine, and estimating, by the processor, a position of an electric motor in mechanical communication with the engine based on the first position data and the second position data.

BRIEF DESCRIPTION OF THE DRAWINGS

The above mentioned and other features and objects of this disclosure, and the manner of attaining them, will become more apparent and the disclosure itself will be better understood by reference to the following description of an embodiment of the disclosure taken in conjunction with the accompanying drawings, wherein.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION

The embodiment disclosed below is not intended to be exhaustive or limit the disclosure to the precise form disclosed in the following detailed description. Rather, the embodiment is chosen and described so that others skilled in the art may utilize its teachings.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Figure 1A:
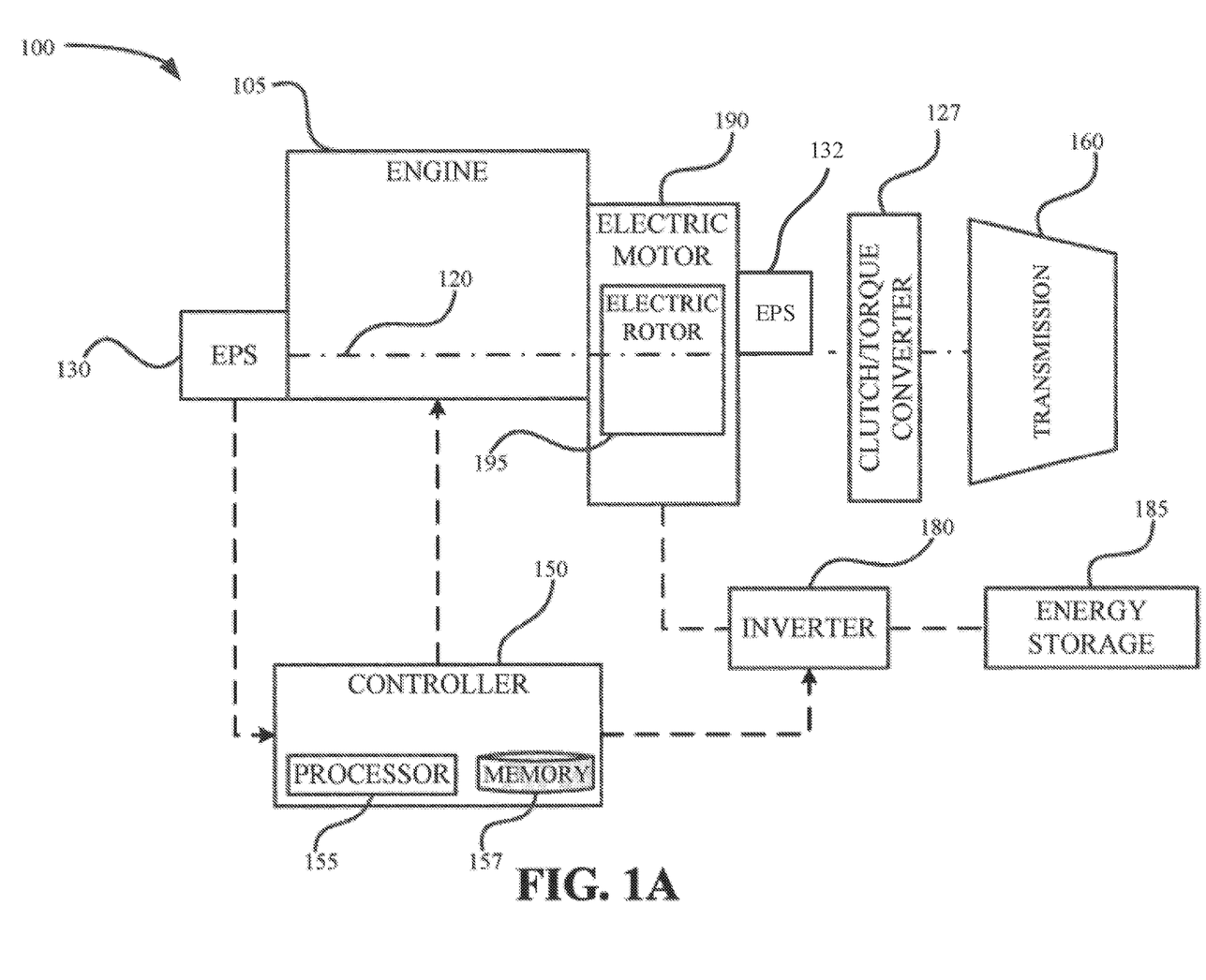
FIGS. 1A and 1B are schematic diagrams of engine and electric motor systems according to various embodiments.

With reference to FIG. 1A, a hybrid system 100 is illustrated. System 100 may comprise an internal combustion engine 105 that may including a crankshaft 120 and a crankshaft sprocket (not shown) coupled to the crankshaft. Engine 105 is not particularly limited and may be any type of reciprocating engine, such as a diesel engine or a gasoline engine. System 100 may also comprise an electric motor 190 in mechanical communication with the crankshaft sprocket. In various embodiments, electric motor 190 may be coupled to a bidirectional engine position sensor 130, engine 105, and a clutch 127 via crankshaft 120. In various embodiments, the bidirectional engine position sensor 130 and motor 90 are in mechanical communication with the crankshaft 120. By being in mechanical communication, the relative position can be maintained and operational control of the engine can continue. Also, the electric motor 190 is not particularly limited and, for example, may be a generator, synchronous motor, or an induction motor.

In various embodiments, system 100 may also comprise a controller 150 in electrical communication with the bidirectional engine position sensor 130 and may include a non-transitory memory 157 having instructions that, in response to execution by a processor 155, cause the processor 155 to determine a position of the internal combustion engine 105 upon shutdown of the engine. For example, at shutdown, the position of the pistons may be determined. In various aspects, this may include determining whether the combustion chamber and/or the piston of and engine is under increased pressure or a vacuum. In various embodiments, processor 155 may store the position of an engine component (e.g., a piston) at shutdown in the non-transitory memory 157. Processor 155, non-transitory memory 157, and controller 150 are not particularly limited and may, for example, be physically separate. Also, in some embodiments, the controller 150, may comprise a processor 155, as illustrated in FIG. 1A.

In certain embodiments, the controller 150 may form a portion of a processing subsystem including one or more computing devices having memory, processing, and communication hardware. The controller 150 may be a single device or a distributed device, and the functions of the controller may be performed by hardware and/or as computer instructions on a non-transient computer readable storage medium, such as non-transitory memory 157.

In certain embodiments, the controller 150 includes one or more interpreters, determiners, evaluators, regulators, and/or processors that functionally execute the operations of the controller. The description herein including interpreters, determiners, evaluators, regulators, and/or processor emphasizes the structural independence of certain aspects of the controller 150, and illustrates one grouping of operations and responsibilities of the controller. Other groupings that execute similar overall operations are understood within the scope of the present application. Interpreters, determiners, evaluators, regulators, and processors may be implemented in hardware and/or as computer instructions on a non-transient computer readable storage medium, and may be distributed across various hardware or computer based components.

Example and non-limiting implementation elements that functionally execute the operations of the controller include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In various embodiments, the processor 155 may be configured to estimate the position of any type of reciprocating engine, such as internal combustion engine 105 at shutdown. Furthermore, the processor may be configured to estimate the position of the electric motor 190, for example, upon shutdown or while the engine 105 and the electric motor 190 are running.

As disclosed herein, system 100 is not particularly limited and may perform any of the methods described within the scope of this disclosure. For example, the processor 155 may be configured to receive position data of the engine 105, estimate the engine position or position of an engine component at shutdown of the engine 105, and store the engine component position at shutdown. Also, in various embodiments, the processor 155 may be configured to estimate the position of the electric motor 190.

Figure 1B:
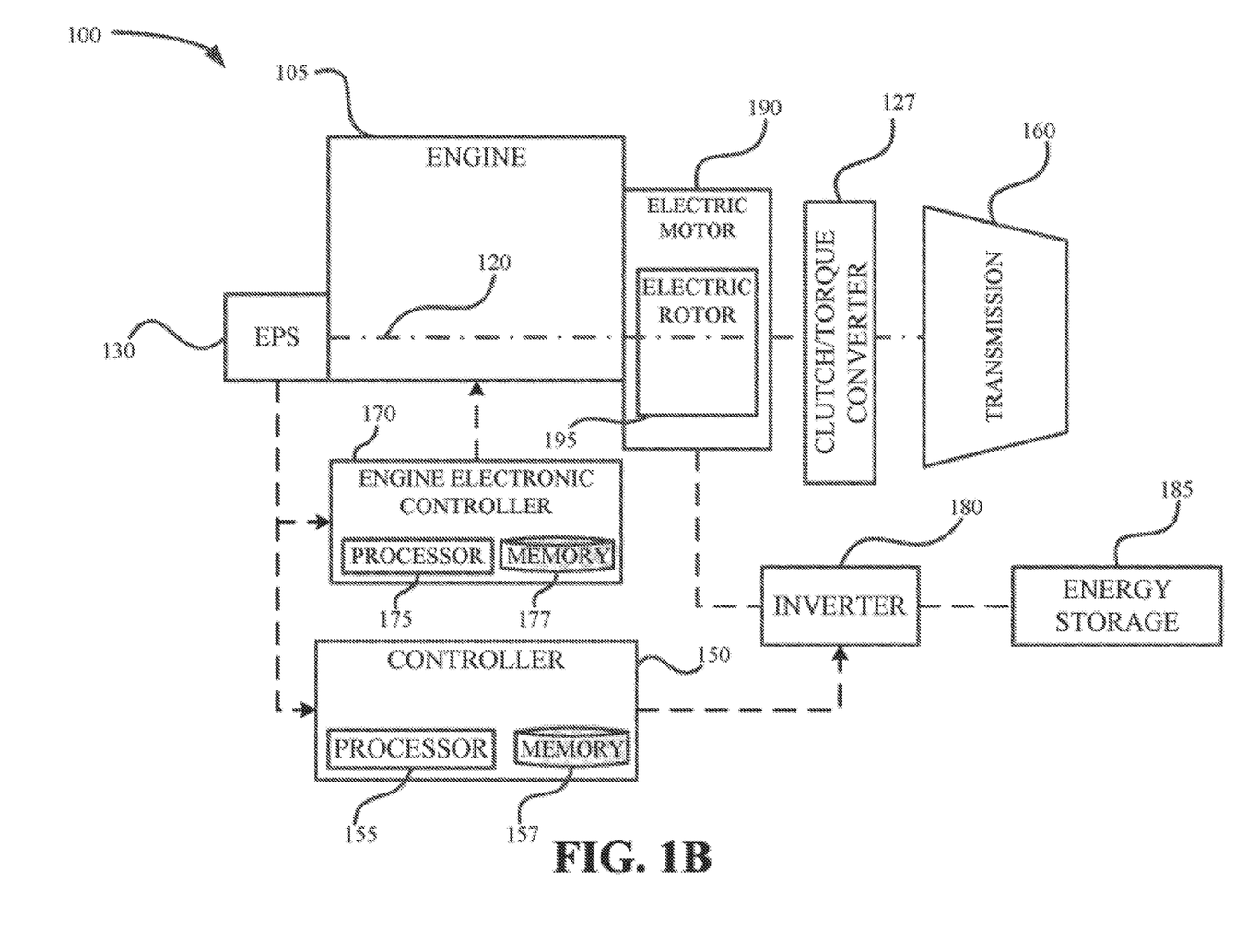
Figure 2:
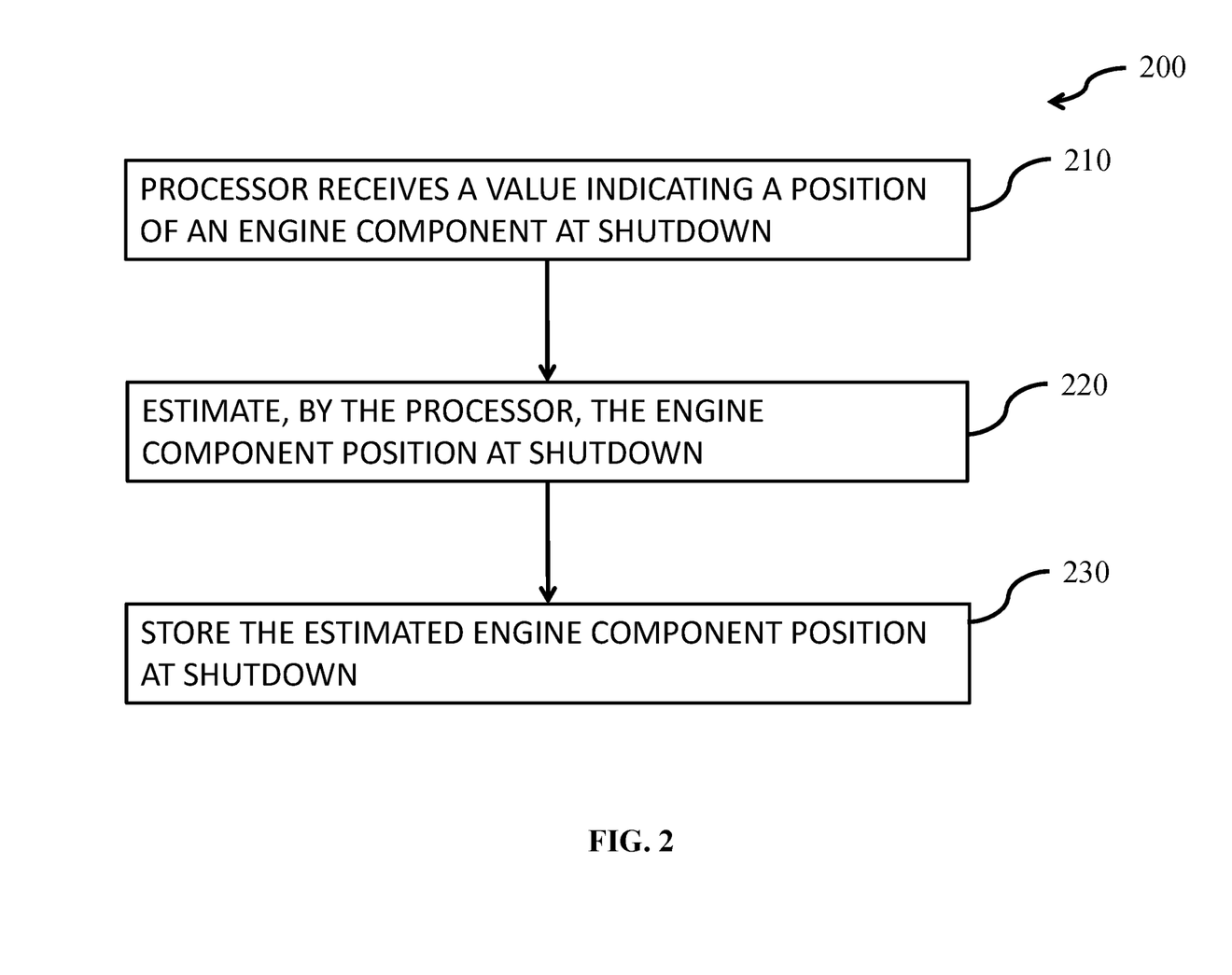
FIG. 2 is a flowchart of a method of storing engine position data according to various embodiments.

As yet another example and with reference to FIG. 2, a method 200 for estimating the position of an engine is illustrated. Method 200 may comprise receiving, by a processor in electrical communication with a first sensor, a value indicating a position of an engine in mechanical communication with an electric motor at shutdown (step 210). The processor then may estimate the engine component position at shutdown of the engine (step 220) and may store, by the processor, the estimated engine component position at shutdown (step 230). For example, processor 150 may store the estimated engine component position at shutdown in non-transitory memory 157 as illustrated in FIGS. 1A and 1B.

In various embodiments, various systems may also comprise a separate engine electric controller 170, which may comprise processor 175 and non-transitory memory 177, as shown in FIG. 1B. In some embodiments, engine controller 170 may also store the estimated engine component position at shutdown in non-transitory memory 177.

Figure 3:
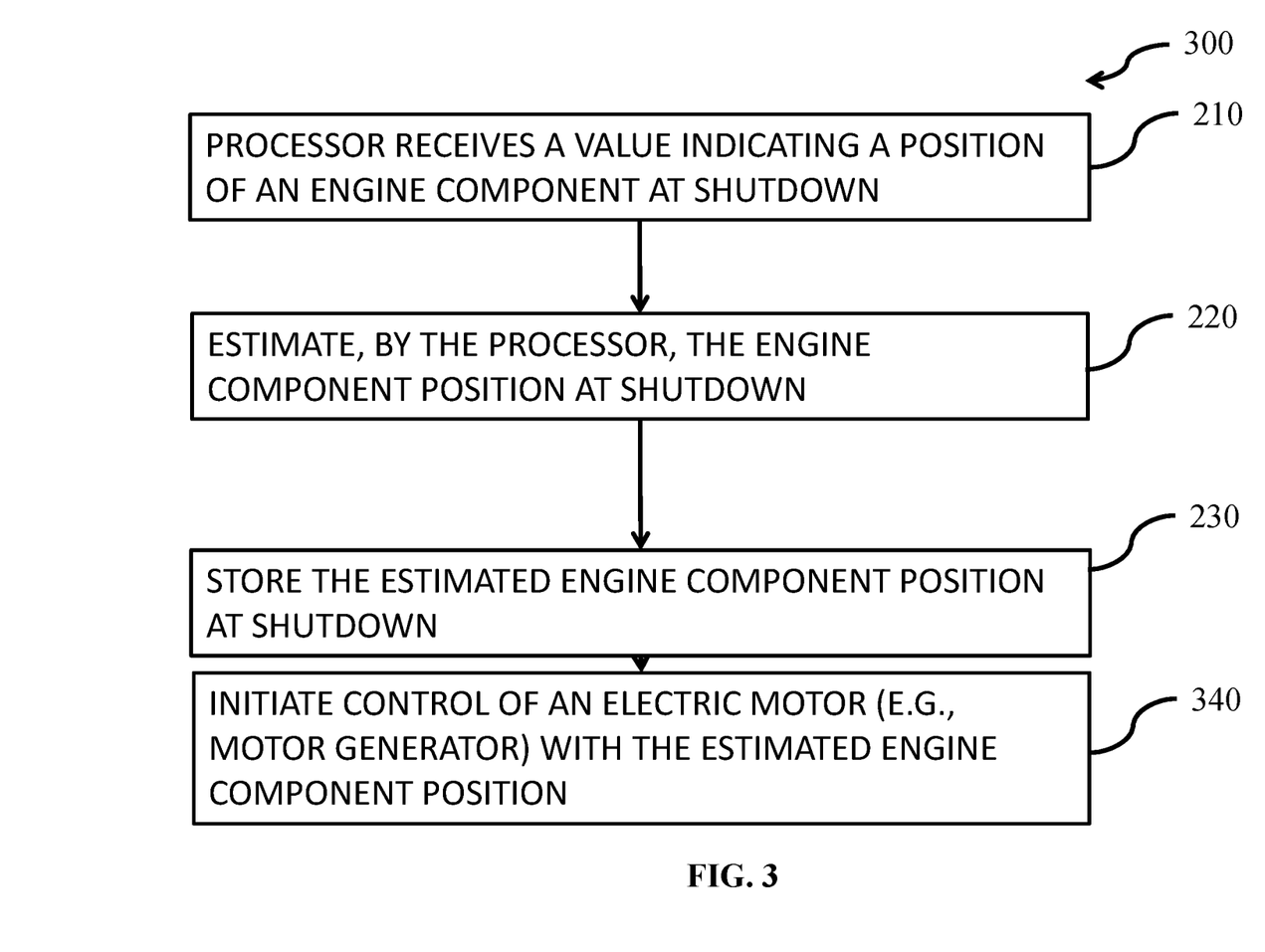
FIG. 3 is a flowchart of a method of accounting for stored engine position data according to various embodiments.

With reference to FIG. 3, method 300 is depicted according to various embodiments. Similar to method 200, method 300 may comprise steps 210, 220, and 230. Method 300 may also comprise controlling, by the processor, an electric motor during restart of the engine (step 340). Storing the estimated engine component position and controlling the electric motor during restart of the engine may allow for the proper amount of torque to be applied during engine startup, thereby conserving the amount of energy required for engine startup. Thus, in various embodiments, a torque input from the electric machine rotor may be altered at or before the startup of the engine.

Figure 4:
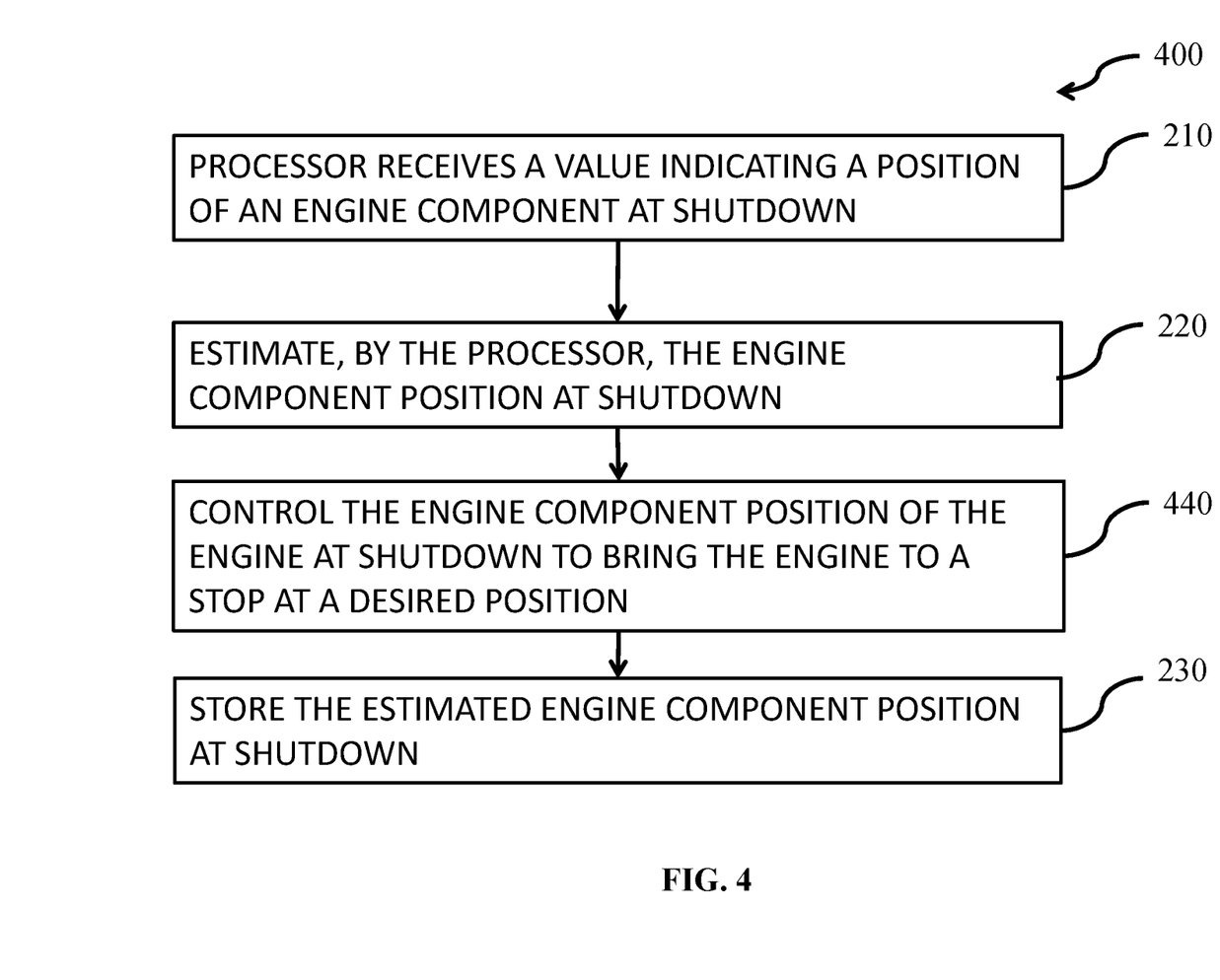
FIG. 4 is a flowchart of a method of controlling the engine position according to various embodiments.

With reference to FIG. 4, a method 400 for controlling and storing the position of the engine component at shutdown is depicted. In various embodiments, method 400 may comprise receiving, by a processor in electrical communication with a first sensor, a value indicating a position of an engine in mechanical communication with an electric motor at shutdown (step 210), estimating the engine component position at shutdown of the engine (step 220), and storing, by the processor, the engine component position at shutdown (step 230). In various embodiments, method 400 may also estimate—prior to or during shutdown—the position at shutdown and then control the position of the engine component at shutdown (step 440), for example, to a desired position through control of the system.

In various embodiments, method 400 may comprise active control of the angular position of the crankshaft at shutdown. In some embodiments, controlling the angular position of the crankshaft at shutdown may leave it at an optimized position for any event for current or anticipated engine conditions. Thus, in various embodiments, optimizing the position of the engine component or motor may reduce an amount of estimated torque needed for the restart of the engine or motor.

Thus, method 400 may incorporate the knowledge of the engine component position to optimize startup as much as possible. Accordingly, as with the other methods disclosed herein, the order of method 400 is not particularly limited. For example, the control of the engine component position at shutdown (step 440) may come after the processor stores the estimated position at shutdown (step 230). In some embodiments, the speed during shutdown (e.g., during the last stages of shutdown) may be controlled so the crankshaft turns at low speeds at the end of the shutdown event in order to obtain an optimal position. Furthermore, in some embodiments the motor may be used to prevent engine reversals during shutdown.

Figure 5:
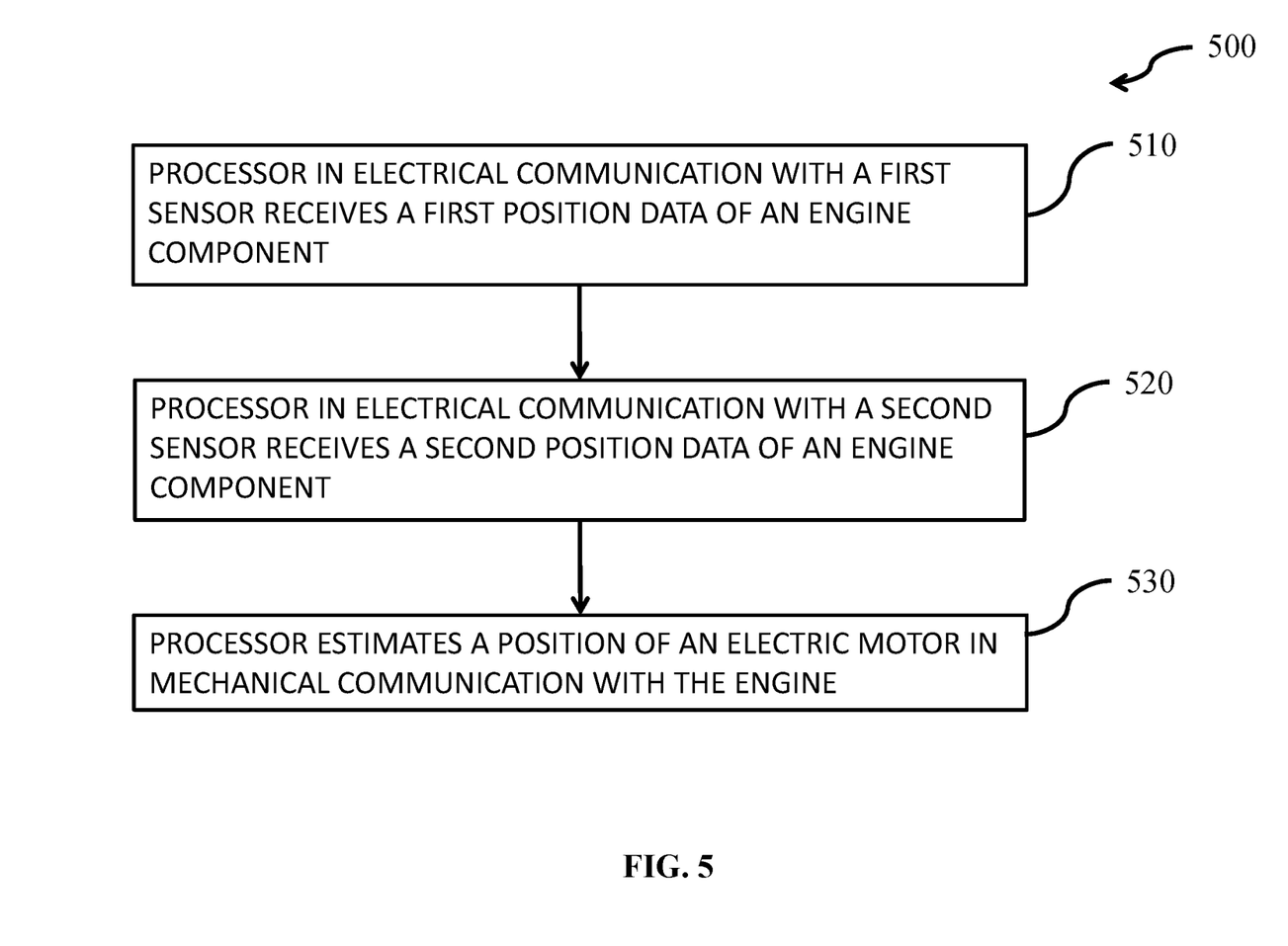
FIG. 5 is a flowchart of a method of estimating the position of an electric motor according to various embodiments.

With reference to FIG. 5, a method 500 for estimating the position of an electric motor in mechanical communication with an engine is depicted. Method 500 may comprise receiving, by a processor in electrical communication with a first sensor (e.g., the bidirectional engine position sensor 130 in FIG. 1A), a first position data of an engine (step 510). Also, the processor in electrical communication with a second sensor (e.g., the bidirectional engine position sensor 132 in FIG. 1B) may receive a second position data of an engine (step 520). Then, in various embodiments, the processor may estimate a position of an electric motor in mechanical communication with the engine (step 530), for example accounting for both the crankshaft angular position and engine reversals.

Figure 6:
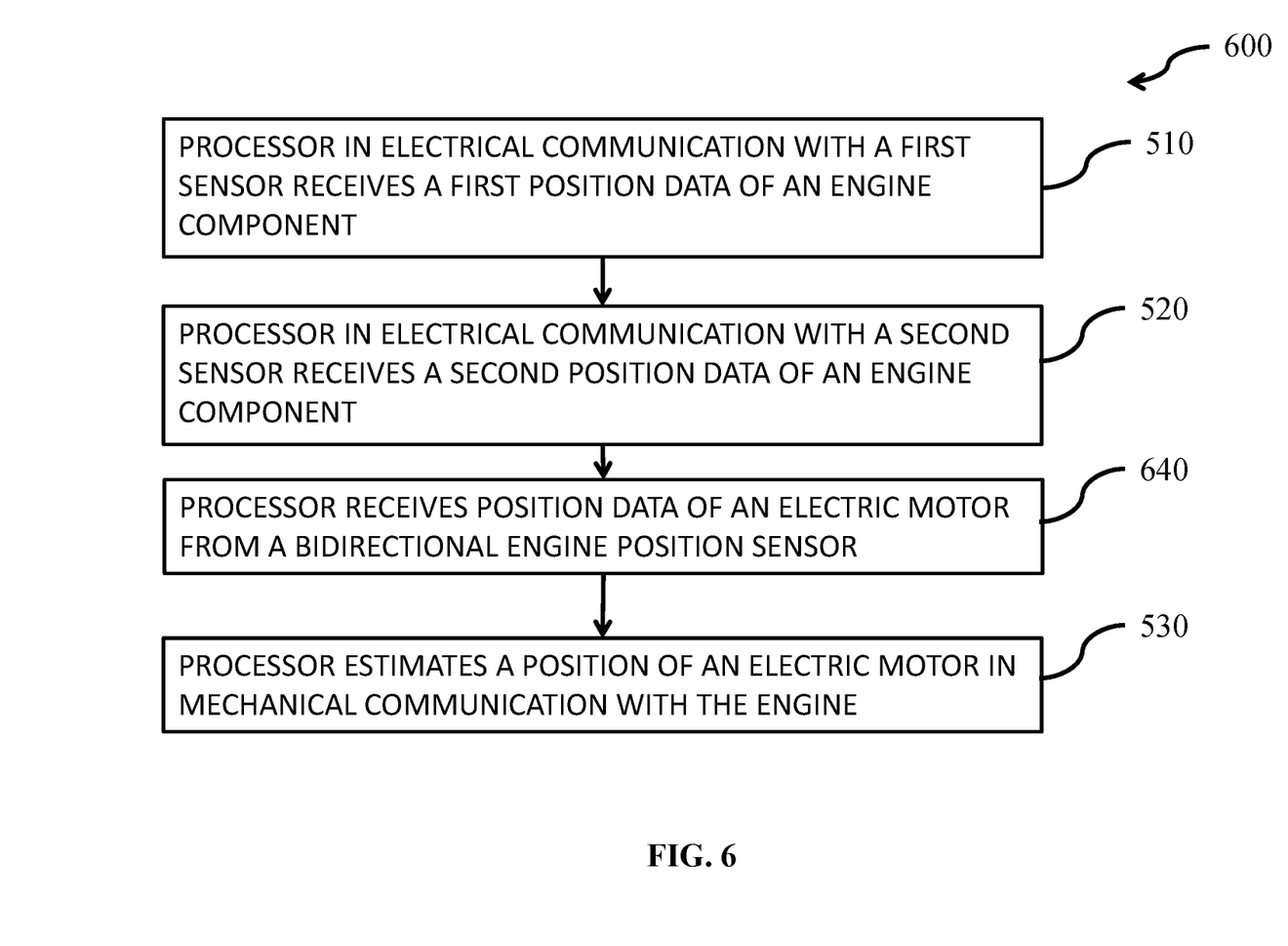
FIG. 6 is a flowchart of a method of estimating the position of an electric motor with a bidirectional engine position sensor according to various embodiments.

In various embodiments and with reference to FIG. 6, the processor may also receive position data of the electric motor from a bidirectional engine position sensor (step 640). According to various embodiments, the information received from the bidirectional engine position sensor can be used to estimate the position of the electric motor. In some embodiments—both system and methods—accounting for the data or information received from the bidirectional engine position sensor and the data or information received from the engine may allow for a more precise determination of engine component position, motor position, or both.

In some embodiments, the machine may be operated exclusively under sensorless control, with the control at 0 rpm for a given initial engine condition (e.g., engine/electric motor position). Thus, various embodiments include controllers 155 that control the electric motor 190 at restart in response to the position of the engine component 105 at shutdown (e.g., 0 rpm).

Figure 7:
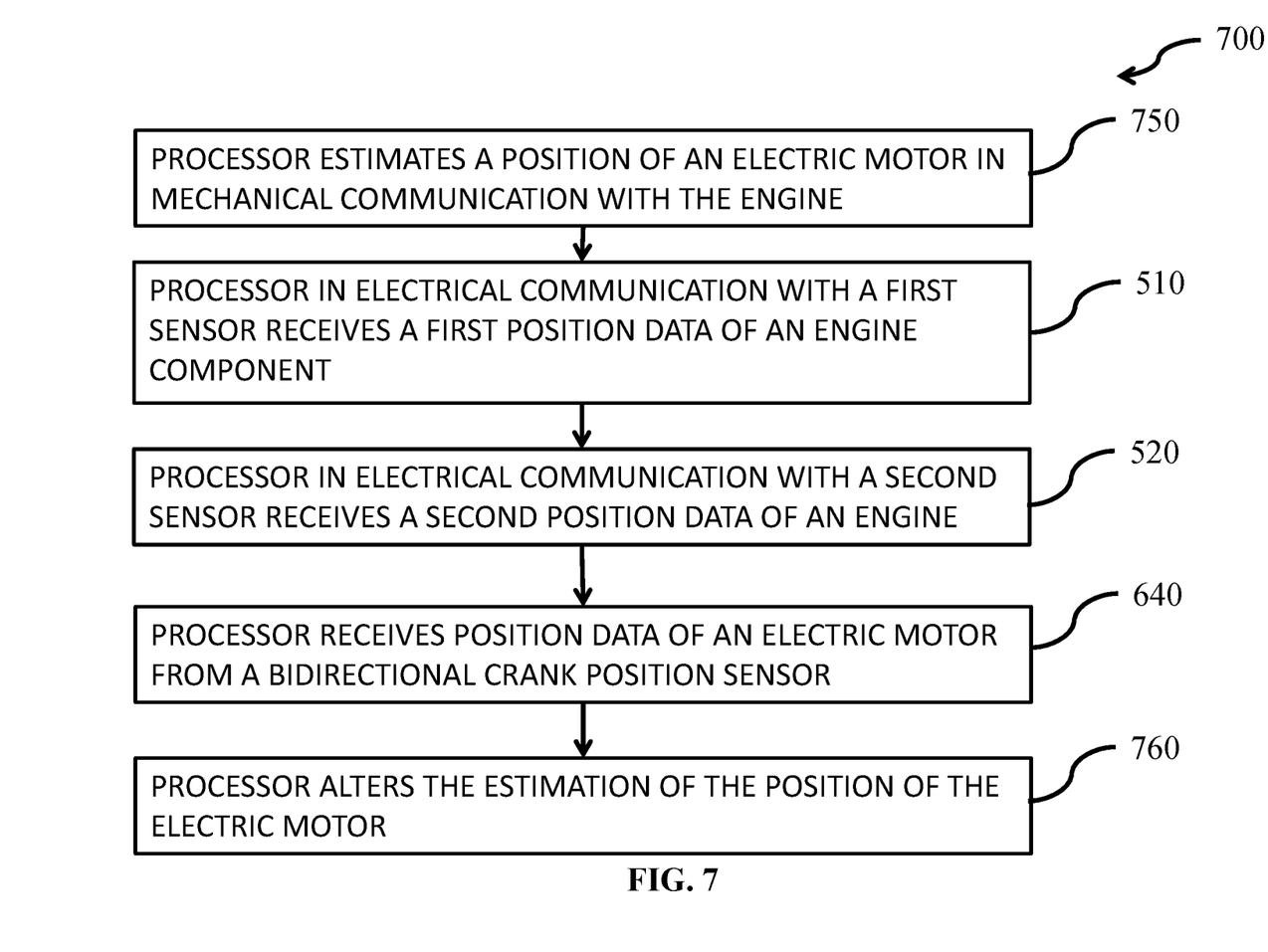
FIG. 7 is a flowchart of a method of estimating the position of an electric motor according to various embodiments.

For example, as illustrated in FIG. 7, a method 700 may comprise estimating a position of an electrical motor in mechanical communication with the engine (step 750). In various embodiments, the processor in electrical communication with a first sensor may receive a first position data of an engine (step 510). Also, the processor may be in electrical communication with a second sensor and may receive a second position data of an engine (step 520) and may also receive electric motor position data. For example, the processor may receive position data of the electric motor from a bidirectional engine position sensor (step 640). Then the processor may alter the estimation of the position of the electric motor (step 760) based on the first position data of the engine, the second position data of the engine, and the electric motor position data. In various embodiments, method 700 may be repeated while the engine is operating.

The methods and algorithms used in the estimation of the position of the electric motor are not particularly limited and can vary depending on various conditions, such as engine conditions. For example, in various embodiments the revolutions per minute of the engine may alter the methods or algorithms for determining the estimated position of the electric motor.

For example, in various embodiments, the bidirectional sensor may send a signal to the controller. This signal varies depending upon which direction the engine is spinning (e.g., if it senses the tone wheel tooth coming from one direction or the other). This is important because during conventional engine shutdown, the engine may experience (sometimes several times) reversals in direction as it comes to rest. Various algorithms may use the signals and the frequency of the pulses to determine the speed and direction of the engine, and apply this direction information to the normal engine position determination all the way to 0 rpm. This estimated position may be held in memory (and modified if additional pulses are detected), and used as a feedforward engine position value when the engine is cranked.

In other words, various control methods may be used not only for different speeds, but in some embodiments, may allow for and operate under sensor-based control from 0 rpm up to maximum engine speeds.

In some embodiments, the shutdown position estimation and conventional engine position signal processing algorithms may be in an inverter controller, with the engine position sensor signals sent to both the engine ECM and/or PE ECM.

In various embodiments, control regions could be incorporated into the various methods and systems disclosed herein. For example, from about 0 revolutions per minute (rpm) to about a first threshold rpm, sensorless control using an initial position estimation for maximum torque output may be used. Then, from about the first threshold rpm to about a second threshold rpm, a combination of sensorless and engine position sensor based control may be used. Finally, in from about the second threshold rpm to a third threshold rpm, engine position sensor based control may be used. Thus, in various embodiments the estimation may be calculated from at least one of sensorless and engine position sensor based control.

In various embodiments, sensorless control from about 0 revolutions per minute (rpm) to about a first threshold rpm, and/or sensorless control using an initial position estimation for maximum torque output may be used. Then, from about the first threshold rpm to about a second threshold rpm, a combination of sensorless and engine position sensor based control may be used.

In other embodiments, sensorless control from about 0 revolutions per minute (rpm) to about a first threshold rpm, and sensorless control using an initial position estimation for maximum torque output may be used. Then, from about the first threshold rpm to a second threshold rpm, sensorless control may be used, for example, exclusively.

In various embodiments, system 100 may be configured—at various times—to operate exclusively under sensorless control, with the control set at 0 rpm, for example, based on the electric motor and engine component position. While different control methods may be used for different engine speeds, methods incorporating sensor-based control may be utilized from speeds between 0 rpm and the maximum engine speed.

According to the various embodiments of the various system and methods disclosed herein, it is believed that the fuel consumption of start/stop operations may be reduced from about 5% to about 20%. Also, the various systems and methods disclosed herein may enable smaller electric machines or faster engine restart responses.

Additionally, systems and methods disclosed herein may enable controls, such as the controller that are capable of injecting current into the electric motor without having a sensed rotor position and, thus, may start producing torque and rotor rotation. Once rotor rotation is started, the accuracy of "traditional" sensorless control algorithms may be enabled and thus utilized throughout the rotating operation of the machine, or the engine position sensor information can be used.

Moreover, the various systems and embodiments disclosed herein may reduce costs by employing fewer sensors and sharing information between components, which may yield systems with the resolution or capability to meet very demanding requirements.

It should be understood that, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system comprising:
   an internal combustion engine including a crankshaft;
   a crankshaft sprocket coupled to the crankshaft;
   an electric motor operatively coupled with an inverter and in mechanical communication with the crankshaft sprocket;
   a bidirectional engine position sensor coupled to the crankshaft sprocket; and
   a controller in electrical communication with a non-transitory memory having instructions that, in response to execution by a processor, cause the processor to:
   estimate an initial position of an engine component using a revolutions-per-minute (rpm) measurement of the engine during a shutdown event,
   operate, using the initial position of the engine component as estimated, the electric motor solely using a sensorless control in which electric motor parameters, voltage, and current measurements of the inverter are used to determine electric motor positions, when the rpm measurement is at or between 0 rpm and a first threshold rpm value greater than 0 rpm for a maximum torque output, operate the electric motor using a combination of the sensorless control and a sensor-based control which uses signal provided by the bidirectional engine position sensor to measure a position of the engine component, when the rpm measurement is greater than the first threshold rpm value and is at or less than a second threshold rpm value greater than the first threshold rpm value, and operate the electric motor solely using the sensor-based control, when the rpm measurement is greater than the second threshold rpm value.

2. The system of claim 1, wherein the processor is configured to estimate the position of the electric motor.

3. The system of claim 1, wherein the controller comprises the processor.

4. The system of claim 1, wherein the electric motor is a generator.

5. The system of claim 1, wherein the bidirectional engine position sensor is a first sensor, and the system comprises another bidirectional engine position sensor coupled to the electric motor which is a second sensor;

wherein the processor
is in electrical communication with the first sensor and the second sensor;
is configured to receive a first position data of an engine from the first sensor;
is configured to receive a second position data of an engine from the second sensor; and
is configured to estimate a position of the electric motor based on the first position data and the second position data.

6. The system of claim 1, wherein the processor is configured to
receive position data of the engine;
estimate an engine component position at shutdown of the engine; and
store the engine component position at shutdown.

7. A method comprising:
receiving, by a processor, a value indicating an initial position of an engine component of an engine in mechanical communication with an electric motor;
estimating, by the processor, the initial position of the engine component using a revolutions- per-minute (rpm) measurement of the engine during a shutdown event;
operating, by the processor using the initial position of the engine component as estimated, the electric motor solely using a sensorless control in which electric motor parameters, voltage, and current measurements of an inverter operatively coupled with the electric motor are used to determine electric motor position, when the rpm measurement is at or between 0 rpm and a first threshold rpm value greater than 0 rpm;
operating, by the processor, the electric motor using a combination of the sensorless control and a sensor-based control which uses signal provided by the bidirectional engine position sensor to measure a position of the engine component, when the rpm measurement is greater than the first threshold rpm value and is at or less than a second threshold rpm value greater than the first threshold rpm value; and
operating, by the processor, the electric motor solely using the sensor-based control, when the rpm measurement is greater than the second threshold rpm value.

8. The method of claim 7, further comprising altering a torque input from the electric motor at or before the startup of the engine.

9. The method of claim 8, wherein the engine is a diesel engine.

10. The method of claim 8, wherein the engine is a gasoline engine.

11. The method of claim 8, wherein the engine is a natural gas engine, an alcohol fueled engine, or an alternative fuel engine.

12. The method of claim 7, further comprising controlling the position of the engine component at shutdown while accounting for the crankshaft angular position.

13. The method of claim 12, wherein controlling the position of the engine component at shutdown includes reducing an amount of estimated torque needed for restart of the engine.

14. A method comprising:
receiving, by a processor, a first position data of an engine and a second position data of an engine;
estimating, by the processor, an initial position of an electric motor in mechanical communication with the engine using a revolutions-per-minute (rpm) measurement of the engine based on the first position data and the second position data; and
controlling, by the processor, the electric motor solely using a sensorless control in which electric motor parameters, voltage, and current measurements of an inverter operatively coupled with the electric motor are used to determine electric motor position, when the rpm measurement is at or between 0 rpm and a first threshold rpm value greater than 0 rpm;
operating, by the processor, the electric motor using a combination of the sensorless control and a sensor-based control which uses signal provided by the bidirectional engine position sensor to measure a position of the engine component, when the rpm measurement is greater than the first threshold rpm value and is at or less than a second threshold rpm value greater than the first threshold rpm value; and
operating, by the processor, the electric motor solely using the sensor-based control, when the rpm measurement is greater than the second threshold rpm value.

15. The method of claim 14, wherein the processor is in electrical communication with a first sensor and a second sensor, and each of the first sensor and the second sensor is a bidirectional engine position sensor.

16. The method of claim 14, further comprising receiving, by the processor, electric motor position data.

17. The method of claim 16, further comprising altering the estimated position of the electric motor based on the first position data of the engine, the second position data of the engine, and the electric motor position data.

18. The method of claim 17, wherein the method is repeated while the engine is operating.

* * * * *